United States Patent [19]

Snyder

[11] Patent Number: 4,549,475
[45] Date of Patent: Oct. 29, 1985

[54] VENTING DEVICE FOR GAS-CARRYING SYSTEMS

[76] Inventor: Hal D. Snyder, 224 N. Enrose, San Pedro, Calif. 90732

[21] Appl. No.: 658,203

[22] Filed: Oct. 5, 1984

[51] Int. Cl.⁴ ............................................. B65D 51/16
[52] U.S. Cl. ...................................... 98/122; 220/372
[58] Field of Search .................. 98/122; 220/366, 372, 220/374

[56] References Cited

U.S. PATENT DOCUMENTS

| | | |
|---|---|---|
| 1,675,503 | 7/1928 | McCallum ........................... 220/372 |
| 1,719,932 | 7/1929 | Holtson .................................. 98/122 |
| 2,493,861 | 1/1950 | Duran .................................. 220/372 |
| 2,494,679 | 1/1950 | Ward, Jr. ........................... 98/122 X |
| 2,620,087 | 12/1952 | Peterson ........................... 98/122 X |
| 3,694,566 | 9/1972 | Thompson et al. ............. 220/372 X |
| 4,337,875 | 7/1982 | Lyons ................................ 220/366 X |
| 4,353,318 | 10/1982 | Williams ........................... 98/122 X |
| 4,392,584 | 7/1983 | Bauer ................................. 220/374 |

Primary Examiner—Harold Joyce
Attorney, Agent, or Firm—Bruce L. Birchard

[57] ABSTRACT

A case closed at one end by a cap and carrying on said cap, inside said case a hub having a stem threaded internally to receive an exhaust pipe from the exhaust port of a gas pressure regulator having an internal relief valve coupled to said exhaust port, the stem of the hub also having, proximate to its supporting cap, an exhaust orifice extending over a sector of the stem; the case having a venting orifice in the wall thereof, such venting orifice being azimuthally aligned with the exhaust orifice in the stem, results in an umbrella vent which permits, in combination with a slotted reading lid in a vault containing the operating umbrella vent according to this invention, the safe dissipation of excess gas pressure in a heating gas distribution system.

10 Claims, 5 Drawing Figures

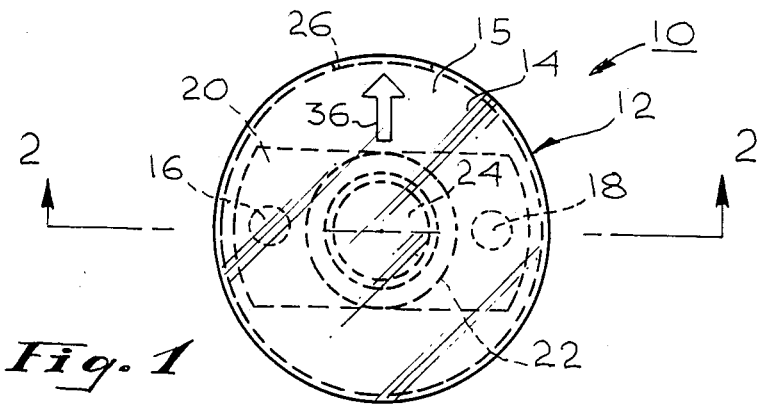
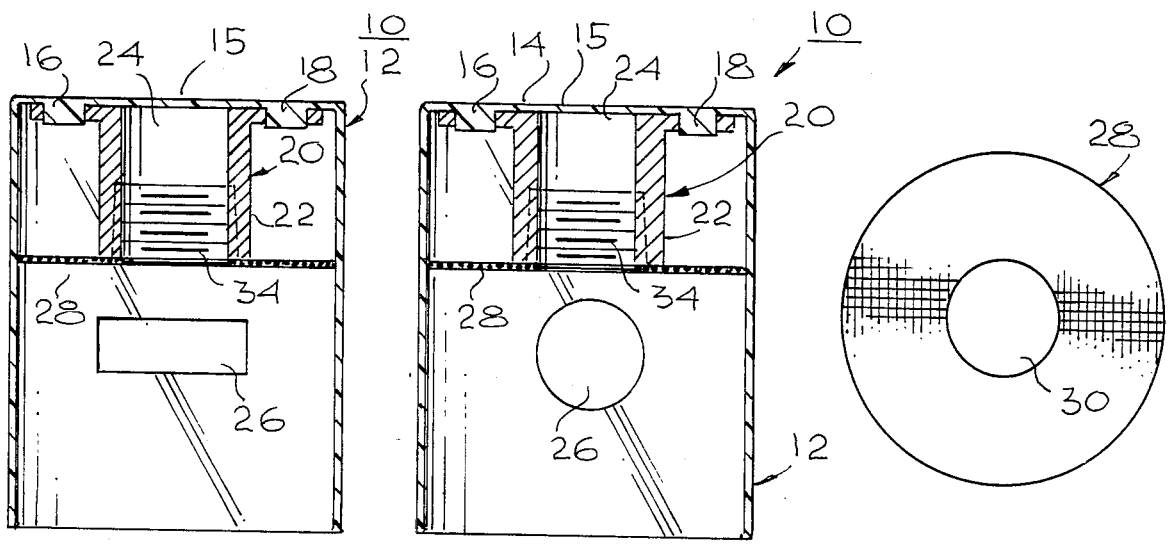
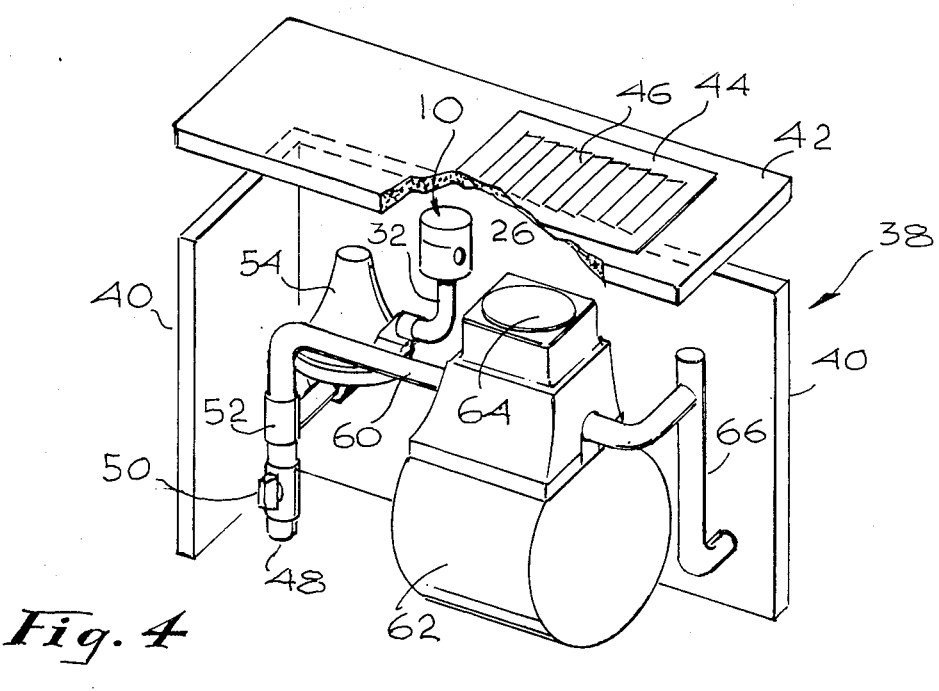

VENTING DEVICE FOR GAS-CARRYING SYSTEMS

BACKGROUND OF THE INVENTION

1. Field of the Invention

This invention relates to devices for venting gas in a gas delivery system and, more particularly, to an improved venting device for safety venting gas in metering vaults.

2. Prior Art

In recent years, heating and cooking equipment utilizing natural or manufactured gas has been changing so as to eliminate the continuously-running pilot light which has been characteristic of such devices in the past. This step has, of course, come from the general drive for increased conservation of natural resources and in most gas-fired devices being manufactured today, the pilot light no longer exists. Instead, electrical spark means are provided to light the gas on demand. Of course, not everybody has switched to the newer devices and some still have pilot lights in their gas-fired equipment. As a result, there is a tendency to have differences in pressure at the sites of the various consumers, a condition which is not to be tolerated. It has become necessary in many of these systems, for example, in the gas distribution system of the Southern California Gas Company in Los Angeles, to install internal relief valve (IRV) regulators. These IRV regulators release, through an internal relief valve, downstream pressure build-up. Such regulators are, however, installed in curb vaults which have limited space. It has been determined by tests conducted in Los Angeles that with a mere 1.0 cubic foot per hour leakage rate arising from the relief process referred to hereinbefore, the gas/air ratio in a vault will reach the lower explosive limit of 4.5% concentration of the heating gas. It was apparent that the ventilation in existing curb vaults was not sufficient to vent the gas being released by the new IRV regulators.

Engineers in the field tried to solve the problem of the dangerous accumulation of gas released by the relief valves, by increasing the number of slots found in the covers on the vaults enclosing the relief valves. If this expedient had been relied upon, hundreds of thousands of slotted covers would have had to have been replaced in the system at a great expense. Further, because the new slotted vault covers would differ from those which had been previously approved by the local governing bodies, great time and money would have had to be expended in obtaining the approvals which would be needed before the new slotted vault covers could have been installed. During that delay, a dangerous condition would exist in the distribution system.

Therefore, it is an object of the present invention to overcome the various problems which have been set forth hereinbefore.

It is a further object of this invention to provide a venting device which will be inexpensive to fabricate and install and will accomplish the needed ventilation of gas arising from internal relief valves necessarily being installed in gas distribution systems.

SUMMARY OF THE INVENTION

By providing for internal relief valve regulators an umbrella-shaped vent which can be coupled directly to the relief outlet of the regulator and has an orifice which can be positioned proximate to the slotted reading lid in the curb vault enclosing the meter and the internal relief valve regulator and can be oriented to direct exhaust gas towards the slotted reading lid, the level of gas-accumulation occurring within the vault can be kept below dangerous levels, all without expensive vault-cover replacements.

BRIEF DESCRIPTIONS OF THE DRAWINGS

Features of the present invention which are believed to be novel are set forth with particularity in the appended claims. The present invention both as to its organization and manner of operation, together with further object advantages thereof, may be best understood by a reference to the following description taken in connection with the accompanying drawings, in which:

FIG. 1 is a top view of a venting device according to my invention;

FIG. 2a is a cross-sectional view taking along the line 2—2 in FIG. 1, according to one embodiment of the invention;

FIG. 2b is a cross-sectional view taking along the line 2—2 in FIG. 1, showing a second embodiment of my invention;

FIG. 3 is a top view of the screen portion of the vent of FIGS. 1 and 2; and,

FIG. 4 is a mechanical schematic drawing showing a vent according to my invention installed for its best performance.

DETAILED DESCRIPTION OF THE PREFERRED EMBODIMENT

In FIGS. 1, 2a and 2b the vent 10 includes a case portion 12 which is cylindrical in shape being closed at its upper end 14 by cap 15 and which may be made of a high-impact thermoplastic material to assure its long life. The cap 15 has two integral depending posts 16 and 18, the purpose of which will be described momentarily. Posts 16 and 18 as may be seen, in cross-section, in FIGS. 2a and 2b cooperate with a pair of openings provided in a hub portion 20 for centering and orienting that hub portion. Hub portion 20 has a stem 22 which can be seen more clearly in FIGS. 2a and 2b. The stem 22 has an orifice 24 at the end thereof proximate to end cover 15. The opening 24 is less than 180 degrees in its extent. Cylindrical case 12 of vent 10 has a venting orifice 26 therein located below stem 22 of hub 20 and, with proper construction of vent 10, orifice 26 is on the same side of case 12 as opening 24 in stem 22 of hub 20. This can be seen from FIGS. 2a and 2b. Orifice 26 may be rectangular or circular in shape. Other shapes of orifice 26, for example, oblong, may be utilized without departing from the scope of this invention.

A bug screen 28 is carried within case 12 of vent 10 to prevent bugs from crawling into the regulating system. The shape of bug screen 28 can be seen in FIG. 3. It is circular in shape with a central opening 30 to permit the passage of an exhaust pipe 32, which may be seen in FIG. 4. As can be seen in FIGS. 2a and 2b, hub 20 has internal threads 34 adapted to cooperate with the external threads at the end of exhaust pipe 32.

Case 12 of vent 10 carries a directional arrow 36 on the end 14, thereof, to assist the installing person to properly orient vent 10 so that aperture 26 faces the slots in the reading lid carried by the top of the vault in which the metering set is installed, as can be seen in FIG. 4.

The general relationship of the parts in the metering vault can be seen from the schematic representation of FIG. 4. Vault 38 has walls 40 which may be made of concrete. For the purpose of making it more clear as to the arrangement of the parts internal to the vault, two of the walls are not shown. Upper cover 42 of vault 38 carries a reading lid 44, therein. Reading lid 44 is provided with slots 46 towards which aperture 26 of vent 10 is oriented for the proper performance of the vent 10.

In the meter set assembly (MSA), as the combination of FIG. 4 is called in the gas distribution industry, heating gas from the main enters through pipe 48 which is coupled through stopcock 50 to the input coupler 52 of internal relief valve regulator 54. The regulator of the type designated by the numeral 54 is available from Fisher Controls and is referred to as the S102 or S112 regulator. It incorporates a vent outlet which may be coupled through pipe 32 to vent 10 of my invention. The fashion in which regulator 54 operates can be determined by reading bulletin 71.1:S100, available from Fisher Controls, P.O. Box 190, Marshalltown, Iowa, 50158 and need not be dealt with here. Gas at a regulated pressure determined by setting of regulator 54 passes through feed pipe 60 to meter 62 which indicates, by means of register 64, the total of cubic feet of gas consumed by the consumer. The gas flow to the consumer is through output pipe 66.

For the convenience of the reader, but without going into any great detail, regulator 54 has limited-capacity internal relief across a diaphram, which it contains, to help minimize over-pressure. Any outlet pressure above the start-to-discharge point of the non-adjustable relief valve spring moves the diaphram in regulator 54 off the relief valve seat, allowing excess pressure to bleed out through an exhaust port coupled to pipe 32, which, in turn, is coupled to vent 10 of this invention.

In a domestic heating gas distribution system, the desired gas pressure is, for example, 8 inches of water over atmospheric pressure.

The function of regulator 54 is to maintain that pressure and, to do so, its internal diaphram, not shown, must respond to excess pressure, a process known as "stroking". Excess gas, in small quantities, is then released thru exhaust pipe 32 and, hence, thru umbrella vent 10. The excess pressure may arise from downstream thermal effects. Occasionally, vault 38 is flooded.

Umbrella vent 10 provides adequate air space above aperture 26 in vent 10 to permit "stroking" of the regulator diaphram, despite such flooding. The pressure regulating action is, thus, uninterrupted by less than catastrophic flooding.

As has been noted, by use of my umbrella vent 10, as described herein, the problem of venting excess heating gas into the curb vault without producing an explosive situation has been completely solved. My umbrella vent directs to excess gas to the slotted reading lid carried in the top of the conventional curb vault, as described hereinbefore.

While particular embodiments of my invention have been shown and described, it will be apparent to those skilled in the art that variations and modifications may be made therein without departing from the spirit and scope of my invention. It is the purpose of the appended claims to cover all such variations and modifications.

I claim:

1. A vent for controlled venting of excess gas in a gas distribution system, including:
    a case having a wall with first and second ends;
    a cap carried by said first end;
    a hub carried by said cap internally of said case;
    said hub having a stem, said stem being directed away from said cap, having internal threads for receiving the external threads of an exhaust pipe and having an exhaust orifice in one sector thereof;
    said case having a venting orifice in the wall thereof for venting gas from said exhaust orifice;
    said exhaust orifice and said venting orifice being azimuthally aligned.

2. Apparatus according to claim 1 in which said case is umbrella shaped.

3. Apparatus according to claim 1 in which said venting orifice is rectangular in shape.

4. Apparatus according to claim 1 in which said venting orifice is circular in shape.

5. Apparatus according to claim 1 which includes in addition, a bug screen transversing said case internally between said first and second ends.

6. For use with a gas-pressure regulator having an internal relief valve and a relief orifice coupled to said relief valve, said regulator, in use, being enclosed in a vault having a slotted reading lid therein, a vent for controlled venting of gas released from said relief orifice, said vent including:
    a case having a wall with first and second ends;
    a cap carried by and closing off said first end of said case;
    a hub carried by said cap internally of said case;
    said hub having a stem, said stem being directed away from said cap, having internal threads for receiving the external threads of an exhaust pipe and having an exhaust orifice in one sector thereof;
    said case having a venting orifice in the wall thereof for venting gas from said exhaust orifice;
    said venting orifice and said exhaust orifice being azimuthally aligned with each other and, in use, being oriented to cooperate with said slotted reading lid in said vault.

7. Apparatus according to claim 6 in which said vent is umbrella shaped.

8. Apparatus according to claim 6 in which said case is cylindrical in shape.

9. Apparatus according to claim 6 in which said exhaust orifice is rectangular in shape.

10. Apparatus according to claim 6 in which said exhaust orifice is circular in shape.

* * * * *